United States Patent [19]

Steiner

[11] Patent Number: 5,197,369
[45] Date of Patent: Mar. 30, 1993

[54] SCROLL SAW BEARING COMPENSATING MECHANISM

[75] Inventor: Robert E. Steiner, Chesterfield, Mo.

[73] Assignee: Emerson Electric Co., St. Louis, Mo.

[21] Appl. No.: 797,178

[22] Filed: Nov. 25, 1991

[51] Int. Cl.⁵ .............................................. B23D 49/00
[52] U.S. Cl. ......................................... 83/782; 83/698
[58] Field of Search ................ 83/783, 781, 782, 698; 384/539, 585, 903

[56] References Cited

U.S. PATENT DOCUMENTS

| 189,461 | 4/1877 | House | 83/782 |
| 220,705 | 10/1879 | Dearborn | 83/782 |
| 2,721,587 | 10/1955 | Dremel | 83/782 X |
| 3,912,332 | 10/1975 | Jones | 384/537 X |
| 4,503,742 | 3/1985 | Sutton | 83/782 X |
| 4,619,171 | 10/1986 | Miller | 83/698 X |

Primary Examiner—Frank T. Yost
Assistant Examiner—Clark F. Dexter
Attorney, Agent, or Firm—Polster, Lieder, Woodruff & Lucchesi

[57] ABSTRACT

A scroll saw is disclosed as having a saw blade connected between the free ends of the arms of a C-shaped member. The C-shaped members is reciprocated about a horizontal pivot shaft at the closed or yoke end of the C-shaped member in order to reciprocate or drive the saw blade. An automatic bearing adjustment mechanism is provided for the horizontal pivot shaft that reciprocates the C-shaped member. For this purpose, an outwardly directed resilient force is applied against one of two bearings at opposite ends of the horizontal pivot shaft, the resilient force also applying an inwardly directed force through the horizontal pivot shaft to the other bearing, in order to eliminate any bearing play during operation and use of the scroll saw.

3 Claims, 2 Drawing Sheets

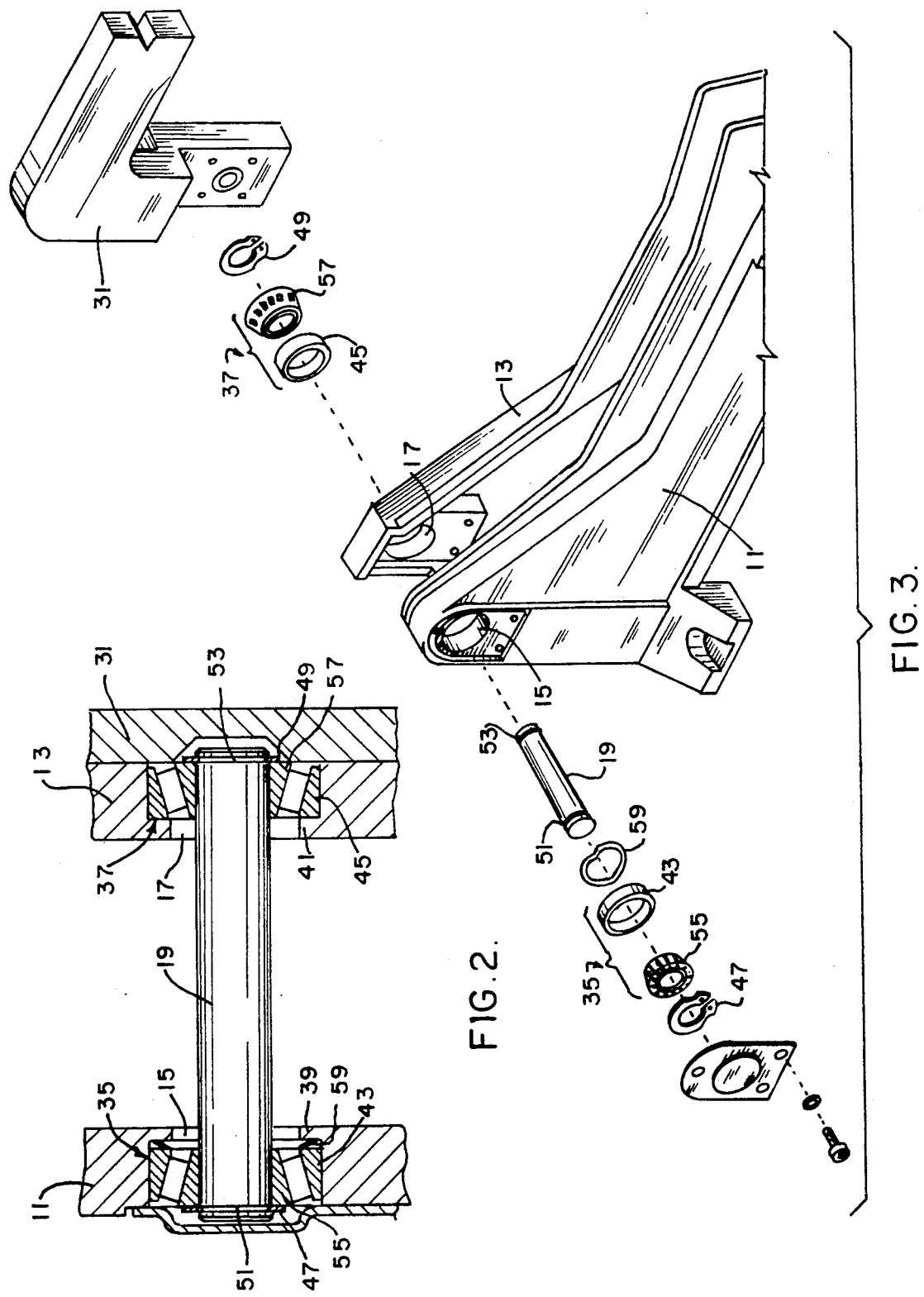

SCROLL SAW BEARING COMPENSATING MECHANISM

BACKGROUND OF THE INVENTION

The present invention relates to an improved scroll saw, and more particularly to an automatic bearing adjustment mechanism which compensates for bearing play in the moving parts of the scroll saw.

Scroll saws or jigsaws include a saw blade connected between the free ends of the arms of a C-shaped member. The C-shaped member is reciprocated about a pivot shaft at the closed end of the C-shaped member in order to reciprocate or drive the saw blade. The saw includes a supporting frame that carries a reciprocating member for rapid reciprocation of the saw blade through an opening in a work table.

The present invention compensates for the wear of bearings mounted on the horizontal pivot shaft that is reciprocated for driving the saw blade. If the bearings become worn, the saw may either have excessive vibration or may not be able to hold the saw blade accurately relative to the work table. In U.S. Pat. No. 4,619,171, one type of bearing compensating mechanism is disclosed as applying a resilient inwardly directed force against bearings mounted on the horizontal pivot shaft, in order to hold the bearings in the desired position during use of the scroll saw. As compared to this prior art patent, the present invention seeks to compensate for bearing wear by applying an outwardly directed resilient force against one of the bearings, with an inwardly directed force also being applied through the horizontal pivot shaft to the other bearing, in order to compensate for bearing wear and thereby eliminate bearing play, as will be discussed in detail below.

SUMMARY OF THE INVENTION

Among the several objects and advantages of the present invention include:

An improved scroll saw which overcomes the above described problems with unique designs and constructions not heretofore contemplated by the prior art;

The aforementioned improved scroll saw which includes an automatic bearing adjustment or compensating mechanism for the horizontal pivot shaft that engages the closed or yoke end of the C-shaped arm, in order to eliminate bearing play during operation and use of the scroll saw; and The aforementioned improved scroll wherein the bearing adjustment mechanism is constructed to eliminate excess vibration and further enables the saw blade to be accurately positioned with respect to the work table.

Briefly stated, the scroll saw of the present invention includes upper and lower reciprocable arms with corresponding upper and lower outer free ends for supporting the saw blade therebetween. A horizontal pivot shaft extends through the curved bight or closed end portion of the C-shaped member, and is provided with bearings at opposite ends thereof which are mounted between inner and outer stop means so as to eliminate axial inward and outward movement of the bearings. Resilient means are positioned between one of the bearings and its associated inner stop for applying an outwardly directed force against one said bearing, with the resilient means also applying an inwardly directed force through the horizontal pivot shaft to the other bearing in order to maintain the other bearing and its associated inner stop in contacting engagement with one another.

The resilient means preferably comprises a resilient washer mounted on the horizontal pivot shaft between the one bearing and its associated inner stop.

The resilient means applies an outwardly directed force against an inner surface of said one bearing. In doing so, the horizontal pivot shaft applies an inwardly directed force to maintain the other bearing and its associated inner stop in contact with one another.

The inner stop for both bearings comprises shoulder means formed on the upstanding bearing support members. The outer stop means for both bearings comprises a slip ring mounted in a groove of the horizontal pivot shaft at opposite ends thereof for engaging an outer surface of an associated bearing.

These and other objects and advantages of the present invention will become apparent from the description that follows;

BRIEF DESCRIPTION OF THE DRAWINGS

In the drawings,

FIG. 2 is a fragmentary front elevational view, partly in section, of an automatic bearing compensating mechanism for use with the horizontal pivot shaft in the improved scroll saw; and FIG. 3 is a fragmentary exploded perspective view of the automatic bearing adjustment mechanism which is used with the horizontal pivot shaft for the C-shaped member of the scroll saw.

Corresponding reference numerals will be used through the several figures of the drawings.

DESCRIPTION OF THE PREFERRED EMBODIMENT

Figure 1:
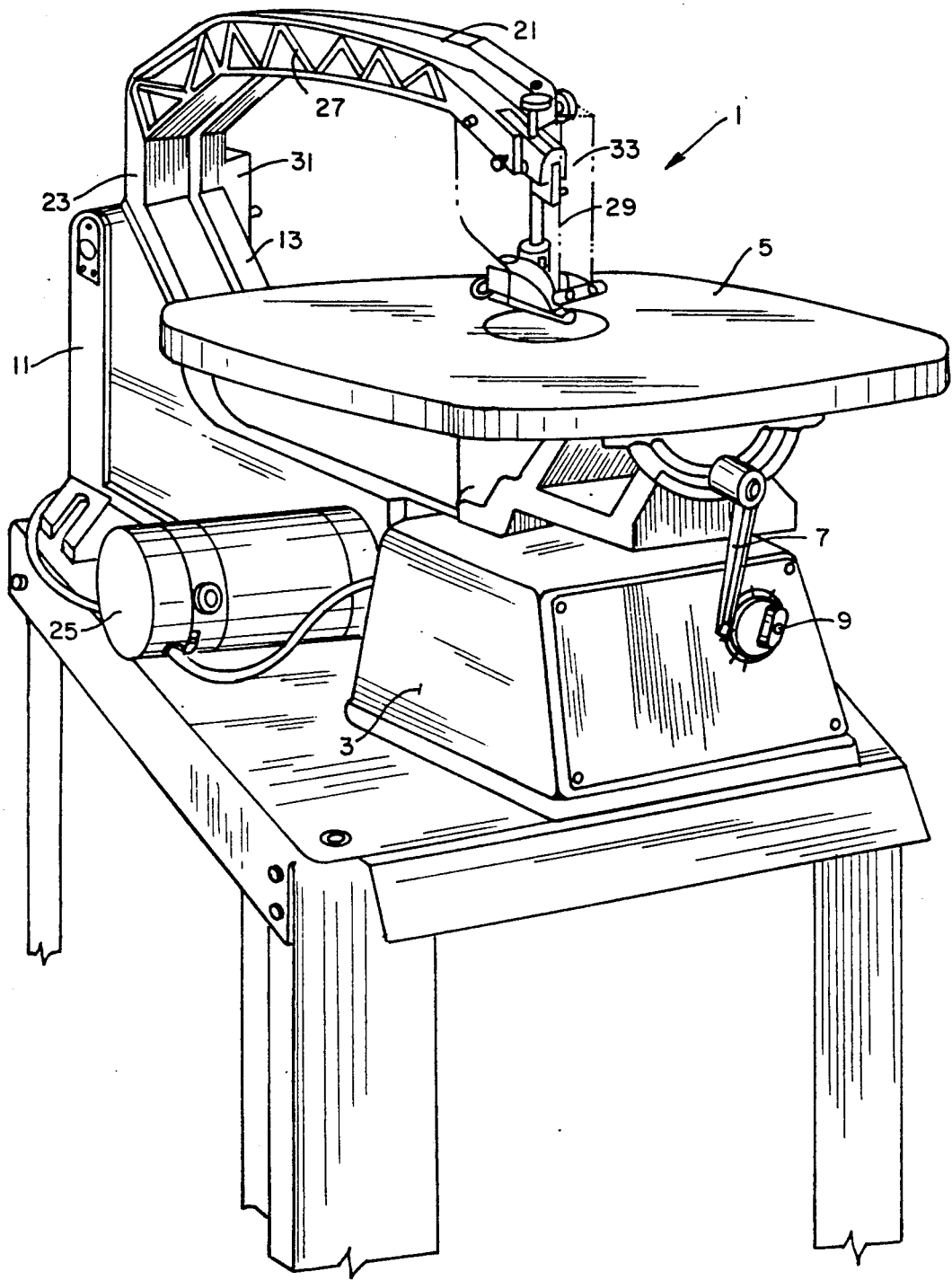
FIG. 1 is a fragmentary front perspective view of an improved scroll which incorporates the features of the present invention.

The following detailed description illustrates the invention by way of example and not by way of limitation. This description will clearly enable one skilled in the art to make and use the invention and describes several embodiments, adaptions, variations, alternatives and uses of the invention, including what I presently believe is the best mode of carrying out the invention.

As seen in FIG. 1 of the drawing, the scroll saw 1 includes a supporting frame 3 for mounting a work table 5 in the position shown, in order to enable a user to support a work piece on the work table 5. The work table 5 can be tilted relative to the horizontal position shown in FIG. 1 by operation of the hand lever 7 which, in turn, operates a trunnion assembly (not shown) for tilting the work table 5 to the desired position. A finger knob control 9 at the front end of the scroll saw 1 operates a power train (not shown) to speed up or slow down the scroll saw.

The supporting frame 3 includes oppositely disposed upstanding bearing support members 11, 13 which have aligned openings 15, 17 (see FIG. 3). Mounted between the upstanding bearing support members 11, 13 is a horizontally extending pivot shaft 19 which is rotatably mounted on the upstanding bearing support members 11, 13 in a bearing support mechanism, to be subsequently discussed.

The scroll saw 1 further includes a C-shaped arm 21 having an opening (not shown) in the generally curved yoke or bight end portion 23 for receipt of the horizontal pivot shaft 19 therein. The C-shaped member 21 is connected to a reciprocating member (not shown) which is, in turn, connected to an electric motor 25 for reciprocating the C-shaped member 21 on the horizontal pivot shaft 19, in order to provide upper to lower reciprocating movement for the C-shaped member 21.

The generally C-shaped member 21 includes an upper arm 27 which extends above the table 5 and a lower arm (not shown) which extends below the table 5. Outer free ends of the upper and lower arms of the C-shaped member 21 support a saw blade 29, shown in dotted lines in FIG. 1 of the drawings. The saw blade 29 extends through an opening (not shown) in the work table 5.

A support arm 31 is connected at its rear end to bearing support member 13 and extends along the upper arm 27 of the C-shaped member to provide support for a blade guard and hold down member, shown in dotted lines in FIG. 1 and generally identified at 33.

All of the above described features of the scroll saw 1 are well known in the art and do not form a part of the present invention per se. However, a background understanding of the aforementioned features will assist in understanding the specific features of the present invention which are directed to the automatic bearing adjustment mechanism now to be discussed.

The automatic bearing compensating mechanism of the present invention is best shown in FIGS. 2-3 of the drawings. As will be understood, the automatic bearing compensating mechanism is constructed for use with the upstanding bearing supporting members 11, 13 having the corresponding aligned openings 15, 17. The openings 15, 17 in the upstanding bearing supporting members 11, 13 receive the tapered roller bearings 35, 37 respectively on the horizontal pivot shaft 19, at opposite ends thereof.

The bearings 35, 37 are mounted on the horizontal pivot shaft 19 between inner and outer stop means to limit axial inward and outward movement of the bearings 35, 37. The inner stop means includes circumferentially extending, radially inwardly directed shoulders 39, 41 formed on the upstanding bearing support members 11, 13. Each shoulder 39, 41 limits axial inward movement of the outer race 43, 45 of the bearings 35, 37. The outer stop means includes slip rings 47, 49 mounted in grooves 51, 53 on opposite outer ends of the horizontal pivot shaft 19. The slip rings 47, 49, when mounted within the grooves 51, 53 of the horizontal pivot shaft 19 engage the inner race 55, 57 of the bearings 35, 37. Thus, the bearings 35, 37 are mounted on the horizontal pivot shaft 19 between the inner stops 39, 41 and the outer stops 47, 49 to limit axial inward and outward movement of the bearings 35, 37.

Positioned between the circumferentially extending, radially inwardly directed shoulder 39 of the upstanding bearing support member 11 and the outer race 43 of the bearing 35 is a wavy spring washer 59 which serves as a resilient means for applying an outwardly directed force against the bearing 35. The outwardly directed resilient or biasing force applied by the wavy spring washer 59 also applies an inwardly directed force through the horizontal pivot shaft 19 to the other bearing 37 so as to maintain bearing 37 and its associated inner stop 41 in contacting engagement with one another. Thus, as the wavy spring washer 59 applies an outwardly directed force against the bearing 35, the bearing 35 is resiliently biased against the outer stop 47, causing the horizontal pivot shaft 19 to be biased to the left as shown in FIG. 2 of the drawings, thereby causing the outer stop 49, on the opposite end of horizontal pivot shaft 19, to apply, through the bearing 37, an inwardly directed force to maintain the bearing 37 and its associated inner stop 41 in contacting engagement with one another.

The automatic bearing compensating mechanism described above compensates for bearing wear by applying a resilient force, through the wavy spring washer 59, as described above. Additionally, bearing play is eliminated, thereby avoiding excess vibrations in the scroll saw 1 and enabling the blade 29 to be accurately positioned with respect to the work table 5, during continued operation and use of the scroll saw.

In view of the above, it will be seen that the several objects and features of this invention are achieved and other advantageous results obtained.

As various changes could be made in the above constructions without departing from the scope of the invention, it is intended that all matter contained in the above description or shown in the accompanying drawing shall be interpreted as illustrative and not in a limiting sense.

I claim:

1. In a scroll saw including a table mounted on a supporting frame, a generally C-shaped member with a curved inner bight portion and upper and lower outer free ends above and below the table respectively, a saw blade extending between the upper and lower outer ends of said C-shaped member and through said table, a horizontal pivot shaft extending through the curved inner bight portion of said C-shaped member for mounting the C-shaped member to said supporting frame, said supporting frame including upstanding bearing support members for receiving a pair of tapered roller bearings in spaced relationship on said horizontal pivot shaft therein, and means for reciprocating said C-shaped member and said horizontal pivot shaft to effect movement of said saw blade, the improvement comprising: a self-contained bearing assembly in which said bearings are mounted on the horizontal pivot shaft between inner and outer stop means thereof for limiting axial inward and outward movement of said bearings, said outer stop means including a pair of slip rings each mounted on said horizontal pivot shaft in outer contacting engagement with one of said bearings, said inner stop means including a pair of spaced shoulder means each formed on one of said upstanding bearing support members in inner contacting engagement with one of said bearings, an resilient means positioned between one of said bearings and its associated inner stop for applying an outwardly directed force against said one bearing and its associated slip ring, said resilient means also applying an inwardly directed force through said horizontal pivot shaft and said other slip ring to the other of said bearings in order to maintain said other bearing and its associated slip ring in outer contacting engagement while its associated inner stop is in inner contacting engagement with said other bearing.

2. The improvement as defined in claim 1 wherein said resilient means comprises a resilient washer mounted on said horizontal pivot shaft between said one bearing and its associated inner stop.

3. The improvement as defined in claim 2 wherein said resilient washer comprises a wavy spring washer.

* * * * *